US009792145B1

(12) United States Patent
Henry et al.

(10) Patent No.: US 9,792,145 B1
(45) Date of Patent: *Oct. 17, 2017

(54) MANAGING DEDICATED AND FLOATING POOL OF VIRTUAL MACHINES BASED ON DEMAND

(71) Applicant: United Services Automobile Association (USAA), San Antonio, TX (US)

(72) Inventors: Benjamin Henry, San Antonio, TX (US); Prithvi Reddy, San Antonio, TX (US); Hong Zhao, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/354,744

(22) Filed: Nov. 17, 2016

Related U.S. Application Data

(63) Continuation of application No. 13/967,041, filed on Aug. 14, 2013, now Pat. No. 9,507,612.

(60) Provisional application No. 61/696,007, filed on Aug. 31, 2012.

(51) Int. Cl.
*G06F 9/455* (2006.01)
*G06F 9/50* (2006.01)

(52) U.S. Cl.
CPC ........ *G06F 9/45558* (2013.01); *G06F 9/5027* (2013.01); *G06F 9/5077* (2013.01); *G06F 2009/4557* (2013.01); *G06F 2209/5011* (2013.01); *G06F 2209/5014* (2013.01)

(58) Field of Classification Search
CPC ............... G06F 9/45558; G06F 9/5077; G06F 2009/4557; G06F 9/5027; G06F 2209/5011; G06F 2209/5014
See application file for complete search history.

(56) References Cited

U.S. PATENT DOCUMENTS

| 7,203,746 | B1 | 4/2007 | Harrop |
| 8,065,676 | B1 | 11/2011 | Sahai et al. |
| 8,484,355 | B1 | 7/2013 | Lochhead et al. |
| 8,631,131 | B2 * | 1/2014 | Kenneth ............. G06F 12/0866 709/203 |
| 8,719,415 | B1 | 5/2014 | Sirota et al. |
| 8,843,933 | B1 | 9/2014 | Holler et al. |
| 9,170,849 | B2 * | 10/2015 | Calder ................. G06F 9/5072 |
| 9,251,115 | B2 | 2/2016 | Bursell |
| 9,372,735 | B2 * | 6/2016 | Calder ................. G06F 9/5077 |
| 2005/0198303 | A1 | 9/2005 | Knauerhase et al. |
| 2007/0130305 | A1 | 6/2007 | Piper et al. |
| 2008/0022284 | A1 | 1/2008 | Cherkasova et al. |
| 2008/0028409 | A1 | 1/2008 | Cherkasova et al. |

(Continued)

*Primary Examiner* — Benjamin Wu
(74) *Attorney, Agent, or Firm* — Fish & Richardson P.C.

(57) ABSTRACT

Methods, systems, and computer readable and executable medium embodiments for managing virtual machine pool demand are described herein. One method for managing virtual machine pool demand includes determining a demand for a number of virtual machines in a pool using data received, identifying the demand for the number of virtual machines in the pool is outside a threshold number, and sending a request for an additional virtual machine to a user to manage demand of the pool.

20 Claims, 3 Drawing Sheets

(56) References Cited

U.S. PATENT DOCUMENTS

| | | |
|---|---|---|
| 2008/0295096 A1 | 11/2008 | Beaty et al. |
| 2010/0131959 A1 | 5/2010 | Spiers et al. |
| 2010/0153946 A1* | 6/2010 | Bhaskar ................. G06F 9/455 718/1 |
| 2010/0199285 A1 | 8/2010 | Medovich |
| 2011/0029970 A1 | 2/2011 | Arasaratnam |
| 2011/0173637 A1 | 7/2011 | Brandwine et al. |
| 2011/0196968 A1 | 8/2011 | Kobayashi et al. |
| 2011/0213886 A1 | 9/2011 | Kelkar et al. |
| 2012/0227038 A1 | 9/2012 | Hunt et al. |
| 2012/0303923 A1 | 11/2012 | Behera et al. |
| 2013/0055239 A1 | 2/2013 | Anderson et al. |
| 2013/0055253 A1 | 2/2013 | Jubran et al. |
| 2013/0111260 A1 | 5/2013 | Reddy et al. |
| 2013/0139152 A1 | 5/2013 | Chang et al. |
| 2013/0159501 A1 | 6/2013 | Meier et al. |
| 2013/0346969 A1 | 12/2013 | Shanmuganathan et al. |
| 2014/0082612 A1 | 3/2014 | Breitgand et al. |
| 2014/0173620 A1 | 6/2014 | Chai |
| 2015/0178137 A1 | 6/2015 | Gordon et al. |

* cited by examiner

MANAGING DEDICATED AND FLOATING POOL OF VIRTUAL MACHINES BASED ON DEMAND

CROSS-REFERENCE TO RELATED APPLICATIONS

This application is a continuation application of and claims priority to U.S. application Ser. No. 13/967,041, filed on Aug. 14, 2013, which claims the benefit of U.S. Provisional application No. 61/696,007, filed Aug. 31, 2012, which are incorporated herein by reference.

TECHNICAL FIELD

The present disclosure relates to methods and system for managing virtual machine pool demand.

BACKGROUND

Virtual machines (VM) can include a software implementation (e.g., instructions) of a machine (e.g., computing device) that executes programs like a real machine. A VM can be an emulated machine and/or emulated platform in hardware, in firmware, and/or in software. For instance, a VM can include an instruction set and other platform resources and/or devices.

DETAILED DESCRIPTION

Figure 1:
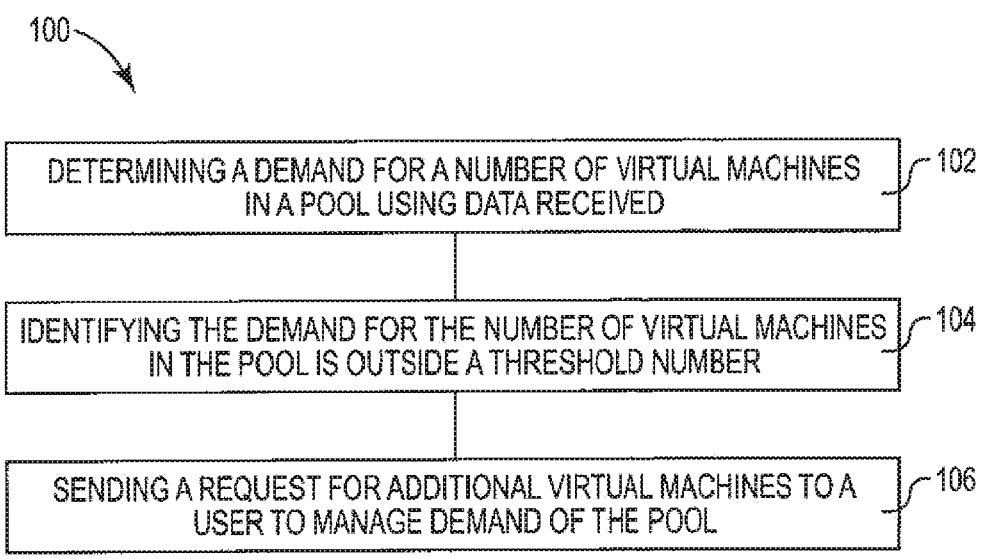
FIG. 1 illustrates a block diagram of an example of a method according to one or more embodiments of the present disclosure.

The present disclosure provides method, system, and computer readable medium embodiments for managing VM pool demand. This can be accomplished through analyzing data of VM usage of a pool of VMs over a period of time.

VMs are becoming increasingly useful as a scalable means for using computer resources (e.g., an entity's computer resources) to meet the computing demands of the entity. For instance, a VM can include a virtual desktop that provides remote desktop sessions to users, a virtual server, and/or a virtual database, among other VMs. The users can be related to the entity, such as employees and/or contractors, for example. A remote desktop session can include resources hosted remotely from the users. The service resources can include processing, memory, storage, and computer-readable instructions (e.g., operating systems and applications) hosted remotely from the user. The resources can be located in storage remote from the user and/or an environment where large amounts of computing resources can be physically maintained. A display and user input devices for interacting with the remote desktop can be located with the user and/or away from the resources. The user and the resources can be connected using the Internet, for example.

In some instances, an entity may have a pool of VMs. A pool of VMs can, for example, include a number of VMs that are used by an entity. An entity can include a business, a business unit of a business, a branch of an entity, a school, and/or an organization, among other entities.

Managing a pool of VMs can include provisioning resources to satisfy entity demand. For example, entity demand can include use of VMs by an entity in a given period of time and/or resource requirements of the VMs in the pool of the entity for the given period of time. Determining demand of a pool of VMs can be difficult due to fluctuating resource requirements caused by changes in the number of users using a VM, changes in resources used by each user, growth of an entity, and/or changes in the entity's business requirements.

In various embodiments, managing VM pool demand can include determining a demand for the VM pool. For example, the demand can include a current use of VMs and/or resources by the pool of VMs. The demand can be compared to a threshold number. If the demand is outside a threshold number of VMs and/or resources, a request for additional VMs can be sent to a user to manage demand of the pool, for example. The user can include a pool user and/or manager of the pool.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. As used herein, "a" or "a number of" something can refer to one or more such things. For example, "a number of objects" can refer to one or more objects.

FIG. 1 illustrates a block diagram of an example of a method 100 according to one or more embodiments of the present disclosure. At 102, the method 100 can include determining a demand for a number of VMs in a pool using data received. The data received can include VM usage of the pool of VMs over a period of time. The data received, as used herein, can include a number of VMs in use and/or resource usage of the number of VMs in use. For instance, resources can include Virtual Desktop Infrastructure (VDI) cloud portal, energy use, server requirements (e.g., number of VMs per server), among other resource usages. The period of time can include a current time and/or a periodic number (e.g., hourly, daily, and weekly). The data can be collected and/or measured, for instance, periodically. Thereby, the demand for the number of VMs in the pool can be determined periodically. For example, periodically can include a number of times a day (e.g., every hour and once a day), every week, and/or once a month, among other periodic times.

In accordance with some embodiments of the present disclosure, a database can be created. The database can be used to store data of the demand for the number of VMs in the pool over a period of time. For instance, the database can store data of VM demand for the pool over a number of periodic times. The database, in one or more embodiments, can include a Structured Query Language (SQL) database. The stored data of the demand can, in various embodiments, be collected over a particular period of time (e.g., as discussed further herein).

In various embodiments, the method 100 can include calculating one or more resource requirements for the number of VMs to meet the determined demand of the pool of VMs in the period of time. The resource requirements can include number of VMs per server, energy use, and/or memory use, among other physical and/or hardware resources. The resource requirement to meet the demand of the pool can be calculated and/or determined overtime and/or periodically.

At 104, the method 100, in accordance with embodiments of the present disclosure, can include identifying the demand for the number of VMs in the pool is outside a threshold number. A threshold number can include a predetermined number of VMs in use. For instance, a threshold number can include a percentage of VMs in the pool that are in use and/or a percentage of VMs in the pool that are available (e.g., not in use). For example, a threshold number can be predetermined to be 90% of VMs in the pool are in use. The demand of VMs for the pool for a given time may be outside the threshold number if the VMs in use in the pool at a given time is above 90% of VMs in the pool (e.g., the number of available VMs is 10% or less).

Determining demand for the number of VMs in the pool is outside the threshold number can depend on the type of pool. For instance, a pool of VMs can include a floating pool and/or a dedicated pool. A floating pool, as used herein, can include a pool of VMs that can be randomly used by a user. For example, a user may log into a virtual desktop and may be assigned a random VM in the pool. A dedicated pool, as used herein, can include VMs that are dedicated and/or assigned to a specific user. For instance, a user may log into a virtual desktop and may be assigned the user's specific VM in the pool. A pool can, for instance, include a combination of floating VMs and dedicated VMs.

In various embodiments, a pool of VMs can be in a floating state. A floating state, as used herein, can include a state wherein a VM is built (e.g., a VM is created and/or resources are provisioned) as a user logs into the VM and the VM is destroyed when the user logs out. In contrast, a pool of VMs in a persistent state can include a state wherein VMs for the pool, whether a floating pool and/or a dedicated pool, are built in advance of a user logging into the VM and exists when the user logs out.

The type of pool can affect the data collected and/or available. For example, in a dedicated pool, individual VMs and/or business units can be measured for resource usage per VM. The data can, in a dedicated pool, be specific to a user assigned to each VM. In a floating pool, for example, measurements of VM usage and resource usage can be based on periodic period of times given that the pool of VMs are unassigned to specific users.

In some embodiments of the present disclosure, the threshold number can be based on a trended demand for the pool of VMs. A trended demand can include a forecast and/or predicted demand of the pool of VMs based on data of VM usage of the pool of VMs over a period of time. The period of time, for instance, can include a year and/or many years, among other periods of time. The data can be, for example, collected from a broker of the pool of VMs and can be stored in a database. A broker, as used herein, can include a server and/or a database used to pool VMs.

For example, based on the data collected, a trended demand for the number of VMs in the pool can be determined. The trended demand can predict changes in the number of VMs needed for a pool for different times of the day, week, and/or year. In addition, the trended demand can include a prediction of an increase in resources needed per VM in use based on a change in business needs and/or requirements of an entity (e.g., each VM requires more energy and/or more storage based on a change in operating system, application, and/or tasks of users using the VMs).

Based on the collected data (e.g., VM usage data and/or past periodic demand determined using VM usage data), an entity can determine (e.g., predict) a trended demand for VMs in the pool, for example. A demand for a given time may be outside the threshold number if, for instance, the demand is above and/or below the threshold number that is determined based on the trended demand.

As an example, a trended demand may identify that a higher number of VMs may be required (e.g., used) for a business unit at the end of a fiscal year than in a remaining portion of the year. The threshold number can, for instance, be based on the trended higher demand during the end of the fiscal year. The number of VMs available and/or in the pool of VMs prior to and/or nearing the end of the fiscal year may be different than the actual demand measured due to the prediction (e.g. trended demand) of use of more VMs. Alternatively and/or in addition, the trended demand can identify an hour of a day (e.g., 12:00 to 1:00 in the afternoon) and/or days of the week (e.g. a particular business unit may only be used on Tuesdays and Thursdays) that at least some VMs of a pool are not in use.

For instance, based on the trended demand, in some embodiments, the threshold number can change. If the trended demand for a pool of VMs indicates and/or predicts that the entity will have an increase in VMs, the threshold number of available VMs and/or unassigned VMs can be increased and/or decreased based on the predicted increase in VMs for the pool. As an example, if a first pool of VMs has a trended demand of an increase in 10 VMs in March, the threshold number of VMs available can be increased by ten. For instance, if the threshold number prior to the trended demand increase of 10 VMs was 10% of the pool is available and/or unassigned, then the threshold number based on the trended demand can include 10% plus ten VMs. Alternatively, if the threshold number prior to the trended demand increase of 10 VMs was 90% of the pool is assigned and/or in use, then the threshold number based on the trended demand can include 90% minus 10 VMs.

In one or more embodiments, the trended demand can change the measured demand. Using the above described example of the first pool of VMs, a trended demand increase of 10 VMs in March can increase the measured demand of VM usage in the pool by 10 VMs. Thereby, if the measured demand prior to adding the trended demand was 60% of VMs are in use and/or assigned, the measured demand based on the trended demand can include 60% plus 10 VMs. The measured demand revised by the trended demand can, for instance, be compared to the threshold number to determine if the pool usage is outside of the threshold number.

Although the present embodiment illustrates a trended demand including a change of VM usage of a pool based on a time of the year, embodiments are not so limited. Trended demand for a pool of VMs, in accordance with a number of embodiments of the present disclosure, can be based on an hour of a day, one or more days of the week, and/or particular shifts, among other trends. For example, a business unit may use a pool of VMs on the days of Tuesday, Thursday, and Saturday. A size of and/or provisioning of resources to the pool of VMs can be revised based on the trended demand (e.g., the time of day, day of the week, time of year, etc.) indicating business use trends (e.g., no use on Monday, Wednesday, Friday, and Sunday). For instance, the pool of VMs for the business unit may be adjusted based on the non-usage on Monday, Wednesday, Friday, and Sunday to be a size of zero.

At 106, the method 100 can include sending a request for additional VMs to a user to manage demand of the pool. The additional VMs, as used herein, can include one or more available VMs. An available VM can, for instance, include a VM in the pool of VMs that is not in use. A VM not in use can include an unassigned VM and/or a VM in excess of the number of VMs in use, for example. The user can include a pool user, pool owner, pool manager, and/or other personal associated with the pool of VMs.

In various embodiments, the request sent can include a request to provision additional infrastructure to the pool of VMs. For instance, in response to determining the resources and/or infrastructure used by a pool of VMs is outside a threshold resource use (e.g., a value) at a given period of time, a request can be sent to provision additional resources and/or infrastructure to the pool. Resources and/or infrastructure requested for provisioning can include servers, storage, network, and/or other physical and/or hardware resources.

A trended demand of resource use and/or infrastructure use of the pool can, for instance, be used to influence and/or affect the threshold demand and/or measured demand of resource use, in some embodiments of the present disclosure. As an example, a threshold resource use can include 80% of server resources of a pool in use. A request can be sent for additional server resources in response to a measured demand for servers at a current time being 75% in use and a determined trended demand of server use including a 10% increase in use (e.g., 75% plus 10% is outside the threshold of 80% of servers in use).

In some embodiments of the present disclosure, the method 100 can include building the one or more additional VMs and/or provisioning resources in response to receiving approval of the request for the one or more additional VMs and/or resources from the user (e.g., pool owner and pool manager). Building an additional VM can include creating and/or provisioning resources and/or a VM. The additional VM can be added to the pool of VMs and/or a buffer pool of VMs. A buffer pool of VMs can include available VMs for the pool of VMs and/or for many pools of VMs.

In accordance with various embodiments of the present disclosure, the method 100 can include automatically creating and/or provisioning one or more additional VMs so that the pool is within the threshold number of VMs and/or automatically provisioning additional resources so that the pool is within the threshold resource use. For instance, based on the demand being outside the threshold number, the one or more additional VMs and/or resources can be automatically created and/or provisioned to the pool of VMs.

Figure 2:
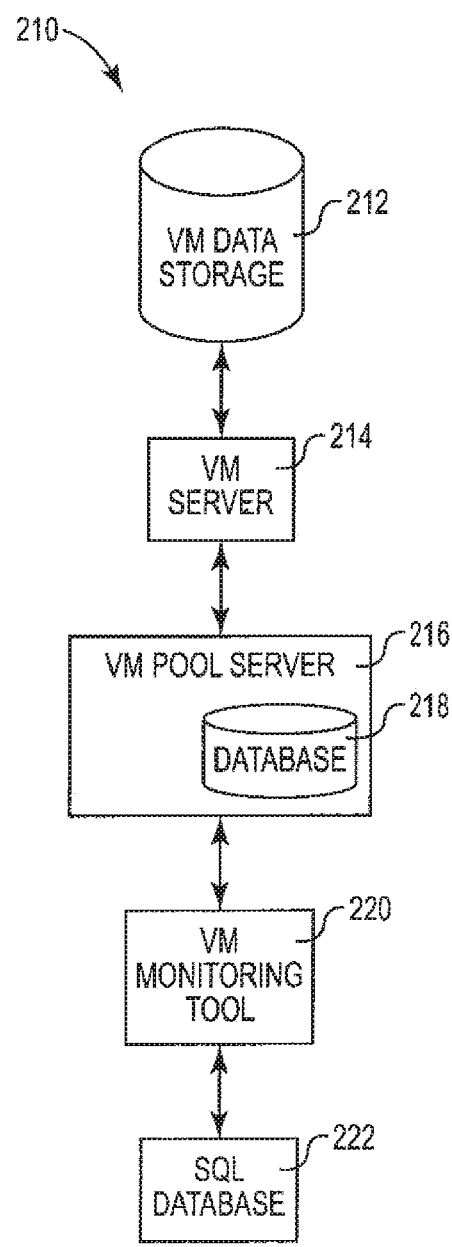
FIG. 2 illustrates a block diagram of an example of a system according to one or more embodiments of the present disclosure.

FIG. 2 illustrates a block diagram of an example of a system according to one or more embodiments of the present disclosure. The system 210, as illustrated in the embodiment of FIG. 2, can be used to monitor VM demand for a pool of VMs using a VM monitoring tool 220.

As shown in the embodiment of FIG. 2, the system 210 can include a VM data storage 212. A VM data storage 212 can include a database to store VM data. A database, as used herein, can include an organized collection of data and/or computer components (e.g., storage and/or memory). As an example, a VM data storage 212 can include a Network Appliance (NetAPP) storage device.

The VM data storage 212 can be connected and/or in communication with a VM server 214. A server, as used herein, can include a computing device and/or hardware dedicated to running one or more services, to serve the needs of users of other computing devices on a network. A server can provide services, for example, across a network. For instance, VMs can be built and hosted on the VM server 214. As an example, a VM server 214 can include a Virtual Center (VCenter) Console.

The VM server 214 can be connected and/or in communication with a VM Pool Server 216. For instance, the VMs can be pooled in the VM Pool Server 216. A VM Pool server 216 can, for example, include a View Manager Broker.

In some examples, the VM Pool Server 216 can include a database 218. The database 218 associated and/or located on the VM Pool Server 216 can store VM, pool, and broker information associated with the VM Pool Server 216. As an example, the database 218 can include an Active Directory Application Mode (ADAM) database associated with a View Manager Broker (e.g., VM Pool Server 216). An ADAM database can, for example, include a directory service capable of running as a service (e.g., a separate server).

The database 218 associated with the VM Pool server 216 can be connected and/or in communication with a VM Monitoring Tool 220. The VM Monitoring Tool 220 can, for instance, include hardware components and/or computer-readable instruction components operable to filter through the database 218 and/or aggregate the desired fields in to a Structured Queried Language (SQL) database 222 for compatibility and easy access for reporting. For instance, the VM Monitoring tool 220 can be utilized with one or more embodiments of the present disclosure.

For example, the SQL database 222 can include a database that can be queried to provide for monitoring of the VM pool. For instance, one or more displays on one or more computing devices can provide information for provisioning automation. The SQL database 222 can be queried, for example, to provide return to service for a user who is in operational and/or down (e.g., VMs that are down), track capacity and utilization in preparation for expansion of the VM pool, and track history for trending purposes (e.g., year to year).

In accordance with some embodiments of the present disclosure, the SQL database 222 can be queried to create reports. For instance, the reports can be based on a calculated trended demand for a pool of VMs and/or infrastructure (e.g., resource) usage of the pool of VMs. Example reports can include a trended budget for an entity based on the trended demand, predicted growth of an entity and/or business unit of an entity based on the trended demand, and/or predicted monetary needs including hardware and storage requirements of an entity and/or business unit of an entity based on the trended demand, and/or an amount and/or trended amount of users logging into VMs at particular periods of time (e.g., for capacity). The reports can be used, for example, to communicate needs of an entity and/or business unit of an entity based on trended demand for a pool of VMs.

Figure 3:
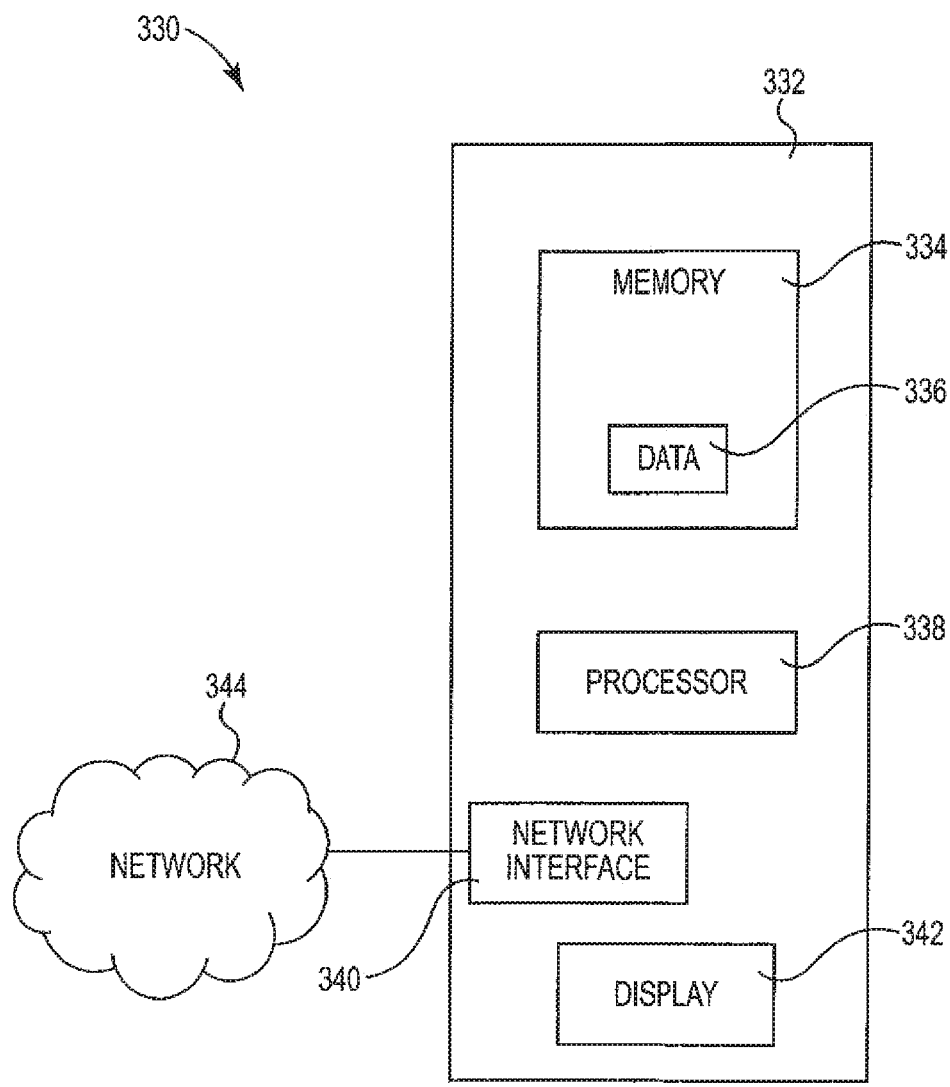
FIG. 3 illustrates a block diagram of an example of a computing system according to one or more embodiments of the present disclosure.

FIG. 3 illustrates a block diagram of an example of a computing system 330 according to one or more embodiments of the present disclosure. The computing system 330 can be utilized with one or more embodiments of the present disclosure. The computing system 330 can include a computing device 332. The computing device 332 can be, for example, a laptop computer and/or a desktop computer, among other types of computing devices.

The computing device 332 can include a memory 334 and a processor 338 coupled to memory 334. For example, the memory 334 can include various types of information including data 336 and executable instructions, as discussed herein. Memory 334 can be any type of storage medium that can be accessed by processor 338 to perform various examples of the present disclosure (e.g., determine a demand for a number of VMs in a pool, identify a demand is outside a threshold number, and send a request to a user for creation of an available VM, etc.) For example, memory 334 can be a non-transitory computing device readable medium having computing device readable instructions (e.g., computing device program instructions, machine readable instructions, computer readable instructions, etc.) and data 336 stored thereon. The computing device readable instructions are executable by processor 338 to perform various examples of the present disclosure. The data 336 can be used (e.g., analyzed by) the computing device readable instructions during their execution.

Memory 334 can be volatile or nonvolatile memory. Memory 334 can also be removable (e.g., portable) memory, or non-removable (e.g., internal) memory. For example, memory 334 can be random access memory (RAM) (e.g., dynamic random access memory (DRAM) and/or phase change random access memory (PCRAM), read-only memory (ROM) (e.g., electrically erasable programmable read-only memory (EEPROM) and/or compact-disc read-only memory (CD-ROM), flash memory, a laser disc, a digital versatile disc (DVD) or other optical disk storage, and/or a magnetic medium such as magnetic cassettes, tapes, or disks, among other types of memory.

Further, although memory 334 is illustrated as being located in computing device 332, embodiments of the present disclosure are not so limited. For example, memory 334 can, in addition to or alternatively, be located internal to another computing resource (e.g., enabling computer readable instructions to be downloaded over the Internet or another wired or wireless connection).

The computing device 332 can include a network interface 340. Network interface 340 can connect the computing device 332 to a network, such as network 344 illustrated in FIG. 3.

Network 344 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 344) can provide a communication system that directly or indirectly links two or more computers and/or peripheral devices and allows users to access resources on other computing resources (e.g., computing devices and/or data storage devices) and/or exchange messages with other users.

A network can allow users to share resources on their own systems with other network users and to access information on centrally located systems or on systems that are located at remote locations. For example, network 344 can tie a number of computing devices together to form a distributed control network (e.g., permit a computing device to connect to a repository of multimedia files hosted and/or uploaded to a central server by other computing devices accessing the network).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network. For instance, the network 344 can be used to connect and/or communicate between devices and/or applications of a system, such as illustrated in the embodiment of FIG. 2 (e.g., system 210).

The computing device 332 can also include a display 342. Display 342 can include, for example, a screen that can provide (e.g., display and/or present) information to a user of computing device 332.

Additionally, computing device 332 can receive information from the user of computing device 332 through an interaction with the user via display 342. For example, computing device 332 can receive input from the user via display 342 (e.g., a touch screen display or via another user input device such as a keyboard in response to interaction with items show on the display). For example, the user can enter the input into computing device 332 using, for instance, a mouse and/or keyboard associated with computing device 332 (e.g., display 342). For instance, a user can enter input to cause the computing device 332 to create a report. The report can, for example, be shown on the display 342.

In one or more embodiments, the processor 338, in association with memory 334, can be associated with data 336 and/or application modules (e.g., not shown in FIG. 3). The processor 338, in association with the memory 334, can store and/or utilize data and/or execute instructions to provide a number of application modules for managing demand of a pool of VMs.

As used herein, a module can be a stand alone program or portion of a program or can be a set of code that provides a particular functionality and may not be stand alone and may not even include instructions interspersed within a set of code. Such application modules can include VM usage data module, trended demand module, threshold VM module, VM pool demand module, request VM module, and/or provisioning VM module.

VM usage data module can, for example, be configured to collect and/or receive VM usage data for a pool of VMs over a period of time. A pool of VMs, in one or more embodiments, can include one or more pools of VMs. For instance, the VM usage data module can collect and/or receive VM usage data for a pool of VMs from a database associated with a VM Pool Server (e.g., as illustrated in 216 and 218 of FIG. 2). VM usage data can, for instance, include resource use of the pool of VMs.

Trended demand module can be configured to determine a trended demand for the pool of VMs using the VM usage data collected and/or received. Determining a trended demand can include predicting a number of VMs that a pool may be using and/or predicting a resource (e.g., hardware and structure) use of a pool of VMs at a given time. That is, a resource requirement to meet the trended demand for the number of VMs in the pool can be determined (e.g., calculated).

Trended demand, in accordance with one or more embodiments, can include determining a future hardware need, future structure need, trends in hiring (e.g., changes in hiring and/or switch to contract work), changes in the workload characteristics of a pool (e.g., change from low usage per VM to high usage per VM), and/or patterns of usage of VMs in the pool (e.g., trends of use based on hours of the day and/or days of the week). Thereby, the trended demand can be used to determine (e.g., calculate) a future hardware use and/or future structure use of the pool. Hardware and/or structure needs can include server requirements, storage requirements, and energy use, among other structure and/or hardware. For instance, trending can include determining and/or predicting how many VMs can be assigned and/or provisioned to one server (e.g., an amount of VMs in a pool that can be supported by one server).

In some embodiments, the trended demand for a pool of VMs determined can be used to create a report. For instance, the report can include hardware and/or structure needs for an entity and/or business unit of an entity based on the trended demand. The report can include budget consideration of the hardware and/or structure needs, and/or patterns of use of the pool of VMs of the entity and/business unit (e.g., growth rate, VM use during different times of the day, week, and/or year, and resource use). The report can, for example, be used to communicate to an entity and/or business unit, and/or be used to budget and/or order hardware and/or structure for the entity and/or business unit.

Threshold VM module can, for example, be configured to calculate a threshold number of VMs for a current time. A threshold number of VMs can include a number of VMs that are available for provisioning and/or a number of unused VMs. VM pool demand module can be configured to identify a demand for a pool is outside of the threshold number of VMs in a current time.

In some embodiments, the threshold VM module can be configured to calculate a threshold resource use of a pool of VMs for a current time. A threshold resource use can include a percentage of a resource that is in use and/or available for use by a pool of VMs. VM pool demand module can, in such instances, be configured to identify a demand for the resource in the pool of VMs is outside of the threshold resource use in a current time.

A provisioning VM module can be configured to automatically create an available VM and/or provision a resource (e.g., hardware, software, and/or Structure) to the pool in response to the pool of VMs being outside the threshold number of VMs and/or resource. Creating an available VM can, for instance, include provisioning the available VM to the pool of VMs. In some instances, the available VM can be created and/or a resource can be provisioned automatically based on the trended demand.

In some embodiments, the threshold VM module can be configured to calculate a threshold number of VMs for a current time based on the determined trended demand for the pool. A threshold number of VMs based on a trended demand can, for example, include a threshold number of VMs plus and/or minus an increase and/or or decrease of VMs based on the trended demand.

In various embodiments, the threshold VM module can be configured to calculate a threshold resource use of the pool of VMs based on the determined trended demand of resources. A threshold resource use based on a trended demand can, for example, include a threshold resource use plus and/or minus an increase and/or a decrease of resource use based on the trended demand of resources.

In accordance with one or more embodiments of the present disclosure, the system 330 can include a request VM module. A request VM module can be configured to send a request to a user (e.g., pool manager and pool owner) for creation of an available VM and/or a resource to manage demand for VMs in the pool. The request, for example, can be a request for approval to create a VM for the pool and/or to provision a resource. For example, in response to receiving an approval from the user, a VM can be automatically created for the pool of VMs and/or a resource can be provisioned (e.g., by the Provisioning VM module).

In various embodiments of the present disclosure, the system 330 can include a remove VM module. A remove VM module can be configured to remove a VM in the pool in response to the VM not being logged into (e.g., has not been used) within a threshold period of time (e.g., an unused VM threshold period of time). A threshold period of time can, for instance, include a week, a month, and/or a year, among other periods of time. A VM that has not been logged into can include an unused VM in the pool. Removing the unused VM from the pool, for instance, can include unassigning the VM to a user in the pool, indicating the VM is an available VM, and/or removing (e.g., deleting) the VM from the pool of VMs.

In some embodiments, a message and/or request to remove an unused VM can be sent to a user of the pool (e.g., pool manager and/or pool owner) and, in response to approval to remove the unused VM from the user, the unused VM can be removed. The message can include one or more unused VMs, for example. That is, the message can include a list of unused VMs that can be sent to the user.

In one or more embodiments of the present disclosure, the system 330 can include a suspend VM module. A suspend VM module can be configured to place a VM in a suspended, low-energy, and/or "sleep" mode when a VM is underutilized. For example, a VM may be underutilized when the VM is not logged into for a period of time. Determining a VM is underutilized can include determining a VM is not logged into within a suspended threshold period of time. A suspended threshold period of time can include an amount of time that is less than an unused VM threshold period of time, for example. A suspended threshold period of time Can include thirty minutes, an hour, and/or a specific time of the day (e.g., 12:00).

For instance, based on trended demand, it can be determined that VMs are underutilized between shift breaks, at a lunch hour, and/or at a specific shift (e.g., morning shift uses more VMs in the pool than the evening shift). Thereby, using the trended demand and/or VM usage data, a period of time can be determined that at least a sub-portion of the pool of VMs will be underutilized and the at least sub-portion of the pool (e.g., a sub-number of VMs in the pool) can be placed in a sleep mode at the period of time.

Alternatively and/or in addition, the system 330 can include a demand provisioning module. A demand provisioning module can be configured to utilize the determined trended demand to adjust a size of a pool of VMs based on the time of the day, the day of the week, and/or the time of year, among other periods of time. For instance, a trended demand can include a determination that a pool of VMs is used between 12:00 and 4:00 in the afternoon. Based on the trended demand, resources can be provisioned to the pool between 12:00 and 4:00 in the afternoon. When the pool of VMs is not in use (e.g., 4:01 in the afternoon to 11:59 in the morning), the pool can be revised to a smaller size than when the pool is in use (e.g., a size of zero). Thereby, the system 330 can provision resources on demand based on business usage trends of the pool of VMs.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense. As used herein, "a" or "a number of" used in referring to a particular thing is intended refer to one or more such things.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, inventive subject matter lies in less than all features of a single disclosed embodiment. Thus, the claims, if provided, are hereby incorporated into the Detailed Description, with each claim standing on its own as a separate embodiment.

What is claimed:

1. A computer-implemented method for managing demand of a pool of virtual machines, the method comprising:
   determining a demand for a number of virtual machines in a pool of virtual machines, wherein, for a pool that is managed as a dedicated pool, the demand is determined based on resource usage per virtual machine in the pool, and, for a pool that is managed as a floating pool, the demand is determined based on times that one or more virtual machines in the pool are unassigned to users of the pool;
   identifying that the determined demand is outside a threshold number of available virtual machines in the pool;
   sending a request for an additional virtual machine to a managing user to manage demand of the pool; and
   provisioning the additional virtual machine to the pool.

2. The computer-implemented method of claim 1, further comprising: calculating a resource requirement to meet the determined demand for the number of virtual machines.

3. The computer-implemented method of claim 1, further comprising: provisioning the additional virtual machine in response to approval of the request from the managing user.

4. The computer-implemented method of claim 1, wherein the determining the demand for the number of virtual machines in the pool is performed periodically.

5. The computer-implemented method of claim 4, wherein periodically includes at least one of hourly, daily, weekly, or monthly.

6. The computer-implemented method of claim 1, further comprising: determining a trended demand for the number of virtual machines in the pool, and adjusting the threshold number of available virtual machines in the pool based on the trended demand.

7. The computer-implemented method of claim 6, further comprising: calculating a resource requirement to meet the determined trended demand for the number of virtual machines in the pool.

8. A non-transitory computer-readable medium storing a set of instructions executable by a processor to cause a computing device to:
   determine a demand for a number of virtual machines in a pool of virtual machines, wherein, for a pool that is managed as a dedicated pool, the demand is determined based on resource usage per virtual machine in the pool, and, for a pool that is managed as a floating pool, the demand is determined based on times that one or more virtual machines in the pool are unassigned to users of the pool;
   identify that the determined demand is outside a threshold number of available virtual machines in the pool;
   send a request for an additional virtual machine to a managing user to manage demand of the pool; and
   provision the additional virtual machine to the pool.

9. The medium of claim 8, wherein the set of instructions further include instructions to automatically create the available virtual machine in response to approval from the managing user.

10. The medium of claim 8, wherein the set of instructions further include instructions to create a report of infrastructure resource usage of the pool.

11. The medium of claim 8, wherein the set of instructions further include instructions to determine a virtual machine in the pool of virtual machines that has not been used within a threshold period of time.

12. The medium of claim 8, wherein the set of instructions further include instructions to send a list of unused virtual machines in the pool to the managing user.

13. A system comprising a processor in communication with a non-transitory computer readable medium, wherein the non-transitory computer readable medium includes a set of instructions executed by the processor to:
   determine a demand for a number of virtual machines in a pool of virtual machines, wherein, for a pool that is managed as a dedicated pool, the demand is determined based on resource usage per virtual machine in the pool, and, for a pool that is managed as a floating pool, the demand is determined based on times that one or more virtual machines in the pool are unassigned to users of the pool;
   identify that the determined demand is outside a threshold number of available virtual machines in the pool;
   send a request for an additional virtual machine to a managing user to manage demand of the pool; and
   provision the additional virtual machine to the pool.

14. The system of claim 13, wherein the set of instructions further include instructions executed to:
   identify that a virtual machine in the pool is underutilized; and
   put the virtual machine in a suspended mode in response to identifying the virtual machine is underutilized.

15. The system of claim 13, wherein the set of instructions further include instructions to automatically remove a virtual machine in response to no log in of the virtual machine by a user within a threshold time period.

16. The system of claim 13, wherein the set of instructions further include instructions to determine a trended demand for the number of virtual machines in the pool, and adjusting the threshold number of available virtual machines in the pool based on the trended demand.

17. The system of claim 16, wherein the set of instructions to determine the trended demand include instructions to determine the number of virtual machines in the pool that can be supported by one server.

18. The system of claim 16, wherein the set of instructions to determine the trended demand include instructions to automatically provision hardware to the pool based on the trended demand.

19. The system of claim 16, wherein the set of instructions to determine the trended demand include instructions to:
 determine a period of time that at least a sub-portion of the pool of virtual machines will be underutilized; and
 place the at least sub-portion of the pool in a sleep mode at the period of time.

20. The system of claim 16, wherein the set of instructions to determine the trended demand include instructions to determine at least one of a trend in hiring, switch to contract work, and change in workload characteristics of the pool.

* * * * *